HOOK CLAMPING CAM 192

BACK JAW CAM 121

FILAMENT CENTERING CAM 100

FILAMENT CONVEYOR CAM 34

FIG·16

JOSEPH L. FREITAS
ERNEST F. STACEY
SAMUEL E. SWASEY
INVENTORS

United States Patent Office 3,212,533
Patented Oct. 19, 1965

3,212,533
METHOD OF AND APPARATUS FOR
FEEDING ARTICLES
Joseph L. Freitas, Salem, Ernest F. Stacey, South Hamilton, and Samuel E. Swasey, Edgemere, Marblehead, Mass., assignors to Sylvania Electric Products Inc., a corporation of Delaware
Filed Mar. 27, 1962, Ser. No. 182,882
12 Claims. (Cl. 140—71.6)

This invention relates to methods of and apparatus for feeding articles and more particularly to a method of and an apparatus for feeding articles which are quite short and which are quite limp. One of the operations in the manufacture of electric lamps and the like is the securing of a filament to support wires, such as lead-in wires. Over the years, many different devices have been developed and utilized to feed and transfer filaments of various types and sizes to the wires provided for their support. Some of these devices are fully automatic in their operation and others are semiautomatic and require the assistance of one or more operators. Most of these devices usually comprise a conveyor system having a plurality of article carriers which are advanced sequentially to present the article to a transfer locus and a transfer device located at the transfer locus to receive the article from the conveyor and present it to the item of work to which it is to be secured.

One of the considerations involved in the design of an article feeding apparatus and its associated transfer device is the degree of accuracy required with respect to the orientation of the article being fed to the members to which it is to be secured. For example, in the manufacture of electric lamps the effective electrical length of a filament between the lead-in wires which support it and to which it is attached is quite critical. Variations in this effective electrical length of the filaments cannot be tolerated because of the resulting non-uniformity of the electrical characteristics of the finished lamps. In view thereof, most filament feeding devices include means for adjusting and maintaining the filaments in proper orientation within very close tolerances and the transfer devices associated therewith are designed to maintain this proper orientation during the transfer operation.

Although the article feeding devices and the transfer devices associated therewith which have been used heretofore have been reasonably satisfactory when employed with filaments of substantial length, a very difficult problem is presented when the feeding and transfer of very short filaments is attempted to be performed automatically. For example, heretofore it has not been possible to automatically feed and transfer filaments of the type used in the manufacture of telephone switch board and indicator lamps. The filament used in the manufacture of many of these lamps is about .0034" in diameter and is only about 4.1 mm. in length. It is not too difficult to effect and maintain the desired orientation of these filaments in their carriers on an article feeding conveyor. However, because these filaments are so short, the use of conventional article-gripping transfer fingers and the like to grip the filament near its ends and present it to the support wires to which it is to be joined is not feasible from a practical viewpoint. There just isn't enough room for these working tools.

In view of the foregoing, one of the principal objects of this invention is to provide a method of and an apparatus for feeding articles which are quite short in length and presenting them to a receiving item of work while maintaining the articles being fed in a predetermined orientation within very close tolerances.

One of the more important features of the method and apparatus of this invention is the elimination of a separate transfer device in effecting this operation.

In the specific embodiment of the method and apparatus of this invention illustrated in the accompanying drawings and described below, the article feeding apparatus comprises a conveyor system which reciprocates between a retracted position and an advanced position. This conveyor system includes a conveyor which indexes during the return stroke of the reciprocating conveyor system and a plurality of spaced article carriers supported on the conveyor. In the specific embodiment of the invention, a lamp filament is the article being fed and a pair of hooked lead-in wires of a lamp stem is the article to which the filament is to be delivered in order that it may be secured thereto. During the first phase of the return stroke of the conveyor system, partial indexing occurs and places an article carrier between the lead-in wires, and the legs of the filament overlie and extend through the hooks of the lead-in wires. The carrier is maintained in this position until after the hooks of the lead-in wires have been closed to secure the filament thereto. The second or final phase of the return stroke of the conveyor system and completion of the indexing of the conveyor occur immediately thereafter, thus displacing the aforementioned carried from between the lead-in wires. While the carrier is disposed between the lead-in wires as aforesaid, a back-up plate which serves as a working surface is moved into position behind each hook of each lead-in wire to enable a clamping head to move in and close each hook about a leg of the filament. Just before the hooks are closed, a final orientation adjustment of the filament is effected.

In the accompanying drawings in which a specific embodiment of the apparatus of this invention is illustrated.

FIG. 2 is a plan view of the filament feeding apparatus of FIG. 1.

FIG. 6 is a fragmentary detail on an enlarged scale of the delivery end of the filament conveyor illustrating the disposition thereof at the forward end of its stroke.

FIG. 9 is a fragmentary detail on an enlarged scale of the delivery end of the filament conveyor illustrating the disposition thereof in its retracted or rest position.

FIG. 14 is a fragmentary detail on an enlarged scale of a portion of the back jaw assembly illustrating the relative position of the components thereof with respect to the filament and the lead-in wires to which it is to be joined.

FIG. 15 is a fragmentary detail of a clamping head and the means associated therewith to actuate it.

Referring now to the drawings, particularly FIGS. 1–4, the filament feeding apparatus of this invention is organized about a main support bracket 10 located at the filament mounting station of a machine of the type disclosed in U.S. Patent 2,637,144, entitled "Automatic Lamp Stem Fabricating Apparatus" which issued on May 5, 1953, to R. M. Gardner et al. The top faces of the upwardly extending arms of the main support bracket 10 are machined to receive a slide 12 on which a filament conveyor identified generally by the reference number 14 is supported. A rod support block 16 is attached to the bottom face of the slide 12. A pair of rods 18 are secured at one end thereof in the block 16. These rods 18 are spring loaded by springs 20 and extend through the bracket 10. A bellcrank lever 22 is pivotally mounted intermediate its ends at 24 on bracket 10. One end of the lever 22 is movable into engagement with the rod support block 16. A connecting rod 26 connects the other end of the bellcrank lever 22 to rocker arm 28 on rocker arm shaft 30. The rocker arm shaft 30 is provided with a cam follower 32 which rides on a filament conveyor cam 34 on filament conveyor cam shaft 36. Thus indexing of the filament conveyor 14 is effected by the filament conveyor cam 34 through the bellcrank lever 22 which displaces rod support block 16 mounted on the lower face of slide 12 on which the filament conveyor 14 is supported.

The filament conveyor

The filament conveyor 14 comprises a pair of spaced endless chains 38 between which a plurality of filament carriers 40 are supported. The chains 38 are supported on and are indexed about double sprockets 42 and 44. The double sprocket 42 is supported on a sprocket shaft 43 in a yoke 46 attached to one end of the slide 12. The double sprocket 44 is supported from the other end of the slide 12. The supporting means for the sprocket 44 comprises a rod housing 48 attached to the end of slide 12, a pair of rods 50, a pair of spaced support brackets 52 mounted on the rods 50 and a sprocket shaft 54 supported by the brackets 52 and on which the sprocket 44 is mounted. Each of the rods 50 is pinned at one end thereof to its corresponding support bracket 52 whereas the other end of each of these rods 50 is slidably disposed within a chamber provided therefor in the rod housing 48. The rods 50 are backed up within the chamber in the rod housing 48 by springs 51 disposed in these chambers.

Figure 1:
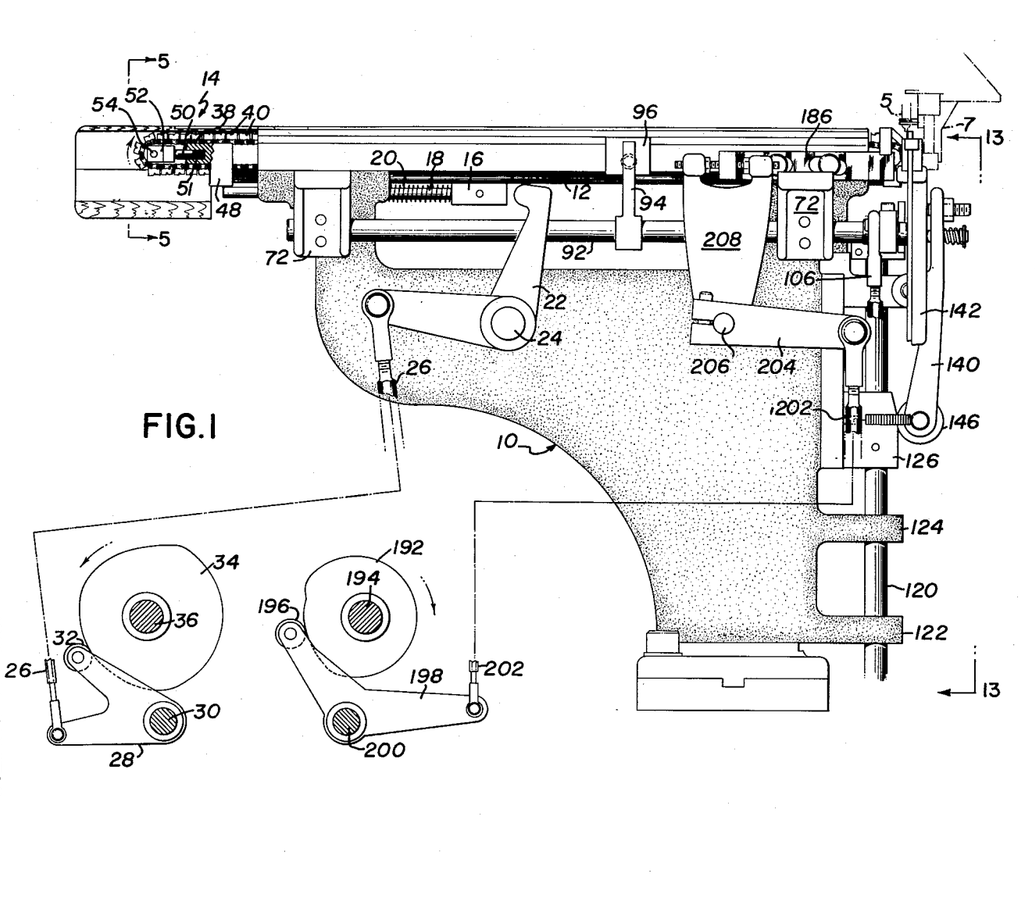
FIG. 1 is a side elevational view of the filament feeding apparatus illustrated in the forward or filament delivery position.
Figure 3:
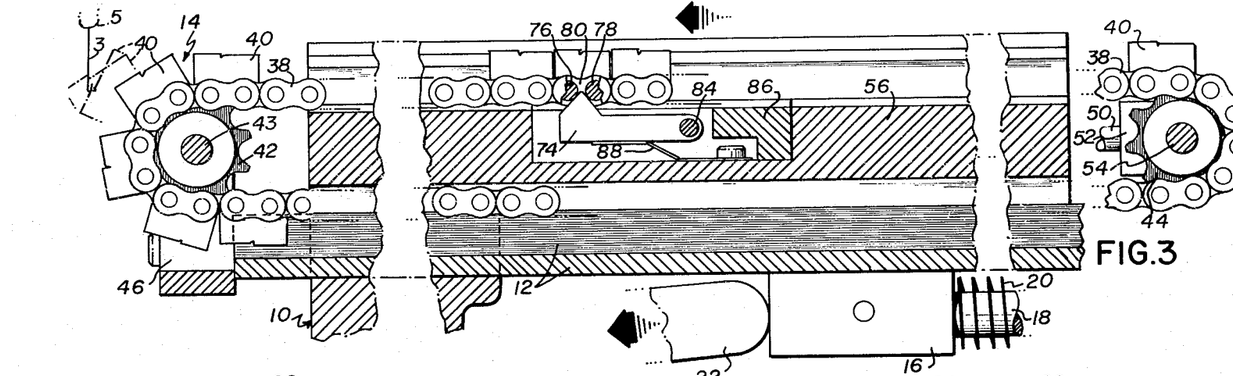
FIG. 3 is a longitudinal sectional view of the filament conveyor and its associated parts shown in the rearward or retracted position and viewed from the side of the apparatus opposite that shown in FIG. 1.
Figure 4:
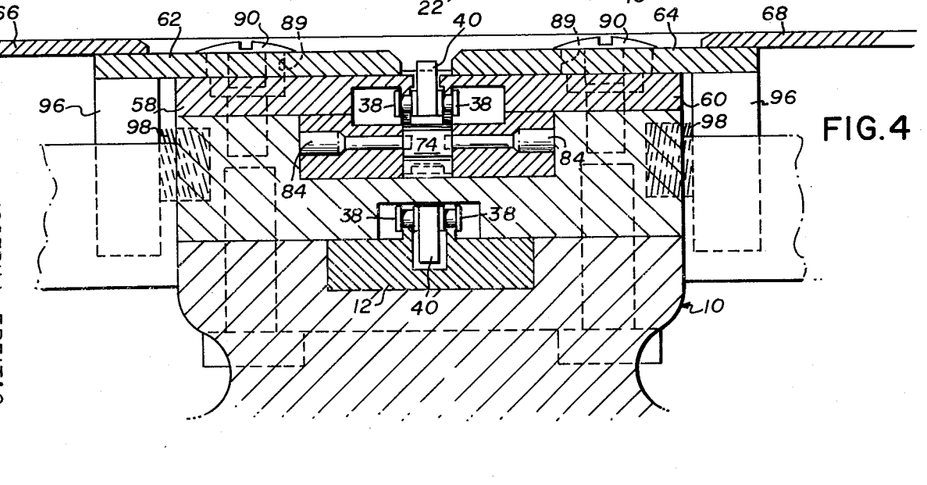
FIG. 4 is a transverse sectional view of the filament conveyor and its associated parts shown in FIG. 3.

As is shown in FIGS. 1–4, particularly FIG. 4, the filament conveyor 14, supported on the slide 12, is practically completely enclosed except for the upper reach of the conveyor as may be noted in FIG. 2, and the front or delivery end thereof as may be noted in FIGS. 1 and 3 for example. Referring now particularly to FIG. 4, a slide housing 56 overlies the top surface of the slide 12 and is fixedly secured to the main support bracket 10. A pair of cover plates 58 and 60, spaced from one another a distance sufficient to permit passage therebetween of the upper reach of the conveyor 14, are fixedly secured to the top face of the slide housing 56. A pair of filament orienting plates 62 and 64 overlies the cover plates 58 and 60 respectively and are pivotally supported thereon as shown in FIG. 2. As shown in FIGS. 2 and 4, a pair of cover plates 66 and 68 overlies the filament orienting plates 62 and 64 respectively. These cover plates 66 and 68 are secured to a table 70. The table 70 is supported by braces 72, two of which are located on each side of the main support bracket 10 as shown in FIG. 1.

One of the components of the mechanism employed to effect indexing of the filament conveyor 14 was described above. It comprises the filament conveyor cam 34 and the linkage associated therewith as shown particularly in FIG. 1. Another component of this mechanism to effect conveyor indexing and filament feeding will now be described. As shown in FIGS. 3 and 4, a pawl 74 is in interlocking engagement with and is disposed between a pair of pins 76 and 78 of a pair of links 80 and 82 of the pair of endless chains 38. The pawl 74 is maintained in interlocking engagement with the upper reach of the conveyor 14 by a leaf spring 88 mounted on the slide housing 56. The contour of the pawl 74 is such that, in combination with the leaf spring 88, it prevents rearward movement of the conveyor chains 38 but does not prevent forward movement thereof.

The manner in which the two cooperating components of the mechanism just described effect both an indexing of the filament conveyor 14 and the presentation of a filament carried thereby to a pair of lead-in wires of a lamp stem will be described below.

Filament orientation

The means employed to effect accurate orientation of each filament along the longitudinal axis thereof will now be described, reference being made particularly to FIGS. 1, 2, 4 and 5. The filament orienting plates 62 and 64 are provided with elongated slots 89 through which pins 90 on the top faces of the cover plates 58 and 60 extend. These filament orienting plates 62 and 64 are periodically nudged toward one another to periodically effect adjustment displacement of each filament in each carrier 40 when the conveyor is at rest. The means employed to perform this operation is shown particularly in FIGS. 1 and 5.

Figure 5:
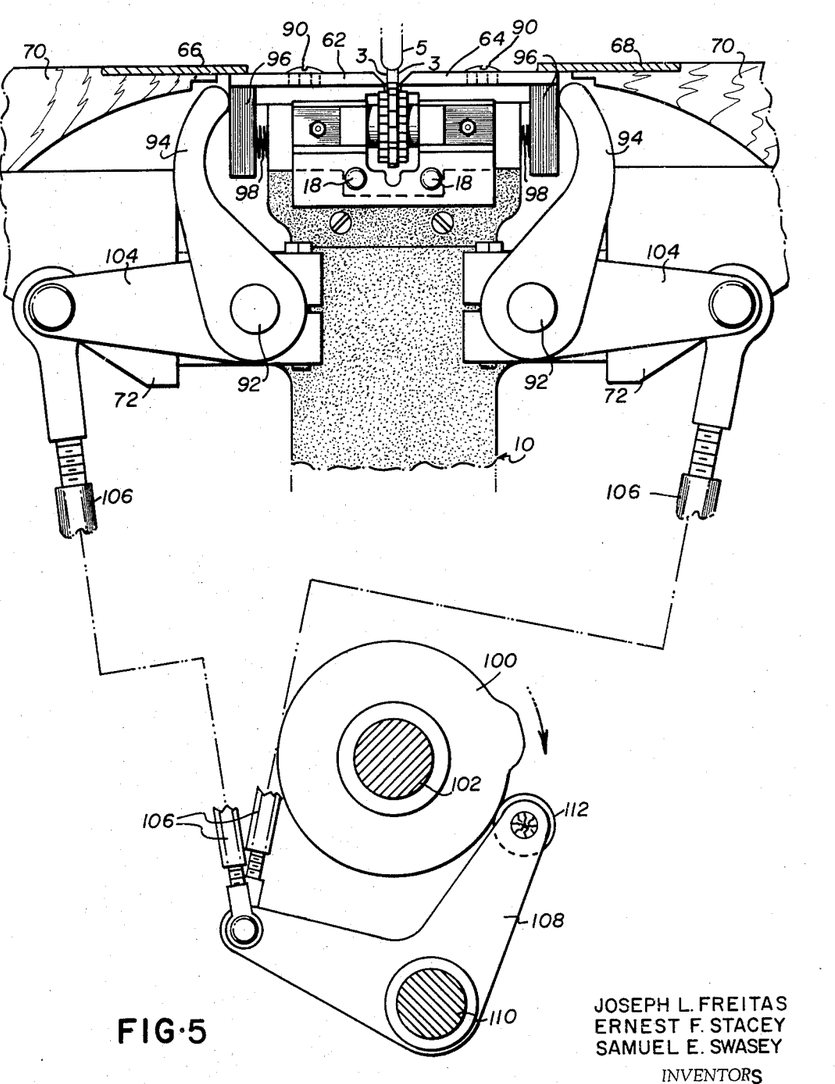
FIG. 5 is an end elevational view looking in the direction 5—5 of FIG. 1.

As shown in FIGS. 1 and 5, a pair of filament centering shafts 92 are rotatably supported in and are disposed on opposite sides of the main support bracket 10. Each of these shafts 92 is provided with a lever 94 secured thereto. The free end of each of these levers 94 is in engagement with a pad 96 secured to and depending from the filament orienting plates 62 and 64 respectively. Each pad 96 is provided with a central aperture for receiving one end of a spring 98, the other end of the spring being fitted in a corresponding aperture in the side face of the slide housing 56. The filament centering shafts 92 are connected to a filament centering cam 100 on filament centering cam shaft 102. A lever 104 connects each of the filament centering shafts 92 to a connecting rod 106 and these two connecting rods 106 are connected to a common rocker arm 108 on rocker arm shaft 110. A cam follower 112 supported on rocker arm 108 rides on the filament centering cam 100, the contour of which is such that during each revolution thereof the levers 94 described above displace the pads 96 toward one another and thus move the filament orienting plates 62 and 64 closer together to effect the desired orientation of the filament on its carrier 40. This periodic adjustment of the disposition of each filament on its respective carrier continues until the filament has been delivered to the lead-in wires of a lamp stem which receives it.

Operation of filament conveyor

Figure 7:
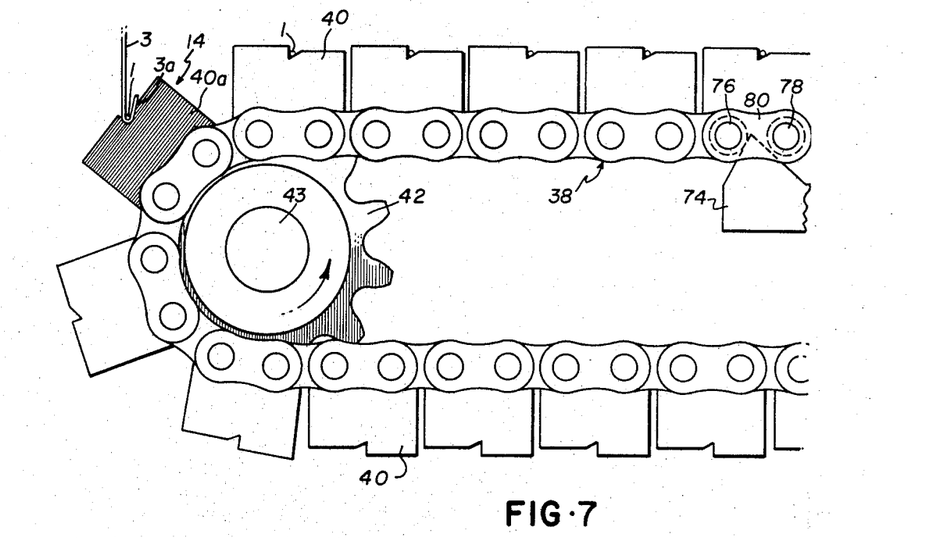
FIG. 7 is a fragmentary detail on an enlarged scale of the delivery end of the filament conveyor illustrating the presentation of a filament to the hooks of a pair of lead-in wires by a filament carrier.
Figure 8:
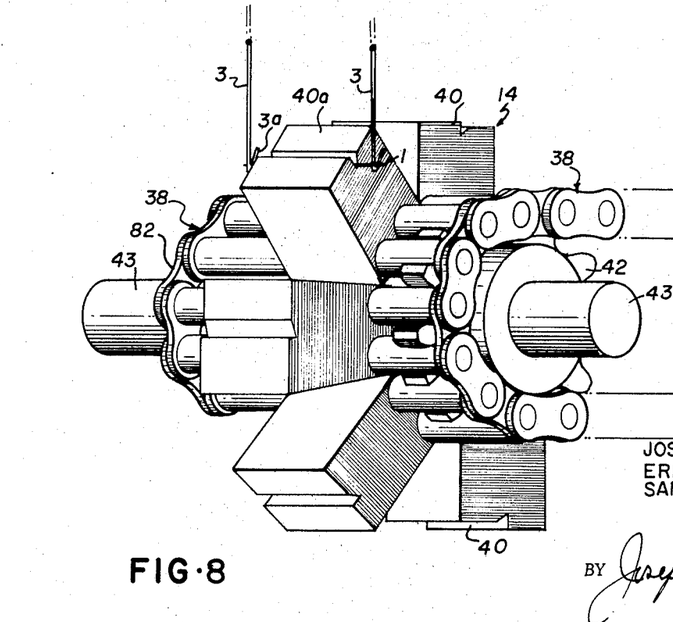
FIG. 8 is an enlarged perspective view of the delivery end of the conveyor showing a filament carrier disposed between the lead-in wires with the main body of the filament supported by its carrier and with the legs thereof extending through the hooks of the lead-in wires.

The operation of the above described mechanisms for effecting indexing of the conveyor 14 to present a filament to a pair of lead-in wires of a lamp stem will now be described. As shown in FIG. 1, the slide 12 on which the filament conveyor 14 is supported is illustrated in its forward or filament-presenting position. An enlarged detail of a portion of the filament conveyor 14 in this filament-presenting position is illustrated in FIG. 6. As shown in FIG. 6, the shaded carrier 40a supporting filament 1 is disposed between a pair of lead-in wires 3 of a lamp stem and the filament 1 is disposed above and in register with the hooks 3a of the lead-in wires 3. Displacement of the conveyor 14 to locate the filament 1 seated on the shaded carrier 40a to place the filament 1 astride and within the hooks 3a of the lead-in wires 3 is effected by a rearward displacement of the slide 12 or a displacement to the left as shown in FIG. 1. The first phase of the rearward movement of the slide 12 displaces the conveyor 14 and moves the carrier 40a from the solid position to the phantom position as shown in FIG. 6. The sprocket 42 and the chains 38 are similarly displaced from the solid to the phantom position as shown in FIG. 6. This disposition of these components is also shown in FIGS. 7 and 8. As is clearly shown in these last-mentioned figures, the carrier 40a has moved between the lead-in wires 3 and the projecting ends of the filament 1 have seated in the hooks 3a of the lead-in wires 3.

The foregoing displacement of the conveyor 14 is effected by the counter-clockwise rotation of the filament conveyor cam 34 as shown in FIG. 1. This counter-clockwise rotation of the filament conveyor cam 34 causes bellcrank lever 22 to rotate counter-clockwise about its pivot 24 and push the rod support block 16 rearwardly. Since the rod support block 16 is secured to the slide 12, the slide 12 is thus caused to move rearwardly. It will be recalled that in the description of FIG. 3 above, it was pointed out that the pawl 74 prevents rearward movement of the chains 38 of the conveyor 14 but does not impede the forward movement thereof. Thus, as the slide 12 is displaced rearwardly by the bellcrank lever 22, the pawl 74 disposed between pins 76 and 78 of the chains 38 prevents the chains 38 from being similarly displaced. With the chains 38 so held, the rearward movement of the slide 12 displaces the sprocket 42, the length of chains 38 extending thereabout and the carrier 40a from the solid to the phantom position as shown in FIG. 6. Thus at the end of the first phase of the rearward movement of the slide 12 the several components of the filament conveyor 14 are in the filament delivery position and are disposed as shown in FIGS. 7 and 8 as well as is shown in phantom in FIG. 6.

During the second or final phase of the rearward movement of the slide 12, the filament delivery end of the conveyor 14 is further displaced in a manner similar to that just described until it assumes the relative position thereof as shown in FIG. 9. As shown in FIG. 9, the filament carrier 40a has moved downwardly and away from the lead-in wires to which it presented a filament and another filament carrier 40b is now ready to be advanced to present its filament 1b to the lead-in wires 3b of another lamp stem.

The means employed to so advance the filament carrier 40b from its position as shown in FIG. 9 to a filament presenting position comparable to filament carrier 40a as shown in FIG. 6 is effected by the forward movement of the slide 12 as viewed in FIG. 1. The contour of the filament conveyor cam 34 is such that at this time it causes clockwise rotation of the bellcrank lever 22 and thus permits the pair of springs 20 on the pair of rods 18 to drive the slide 12 forward. As was described above in connection with the description of FIG. 3, the pawl 74 does not prevent forward movement of the chains 38 of the conveyor 14 and thus, as the slide 12 moves forward carrying the conveyor 14 with it, the chains 38 advance one link with respect to the pawl 74. This forward movement of the entire conveyor 14 and the advancement of the chains 38 thereof one link with respect to the pawl 74 advances the carrier 40b from the position thereof as shown in FIG. 9 to a position comparable to the position of the carrier 40a as shown in FIG. 6. This completes one operating cycle of the filament conveyor 14.

*Final filament orientation assembly*

Figure 10:
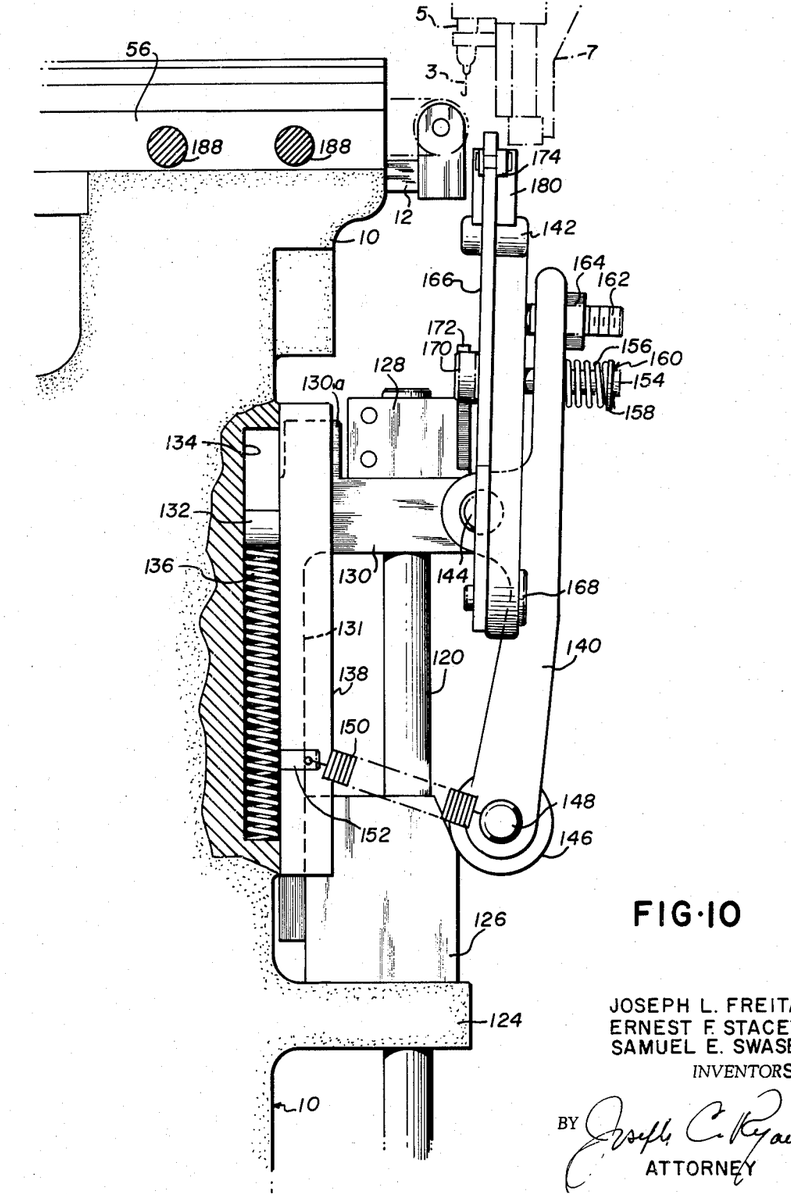
FIG. 10 is a side elevational view partly in section showing the back jaw assembly in its rest or retracted position.
Figure 11:
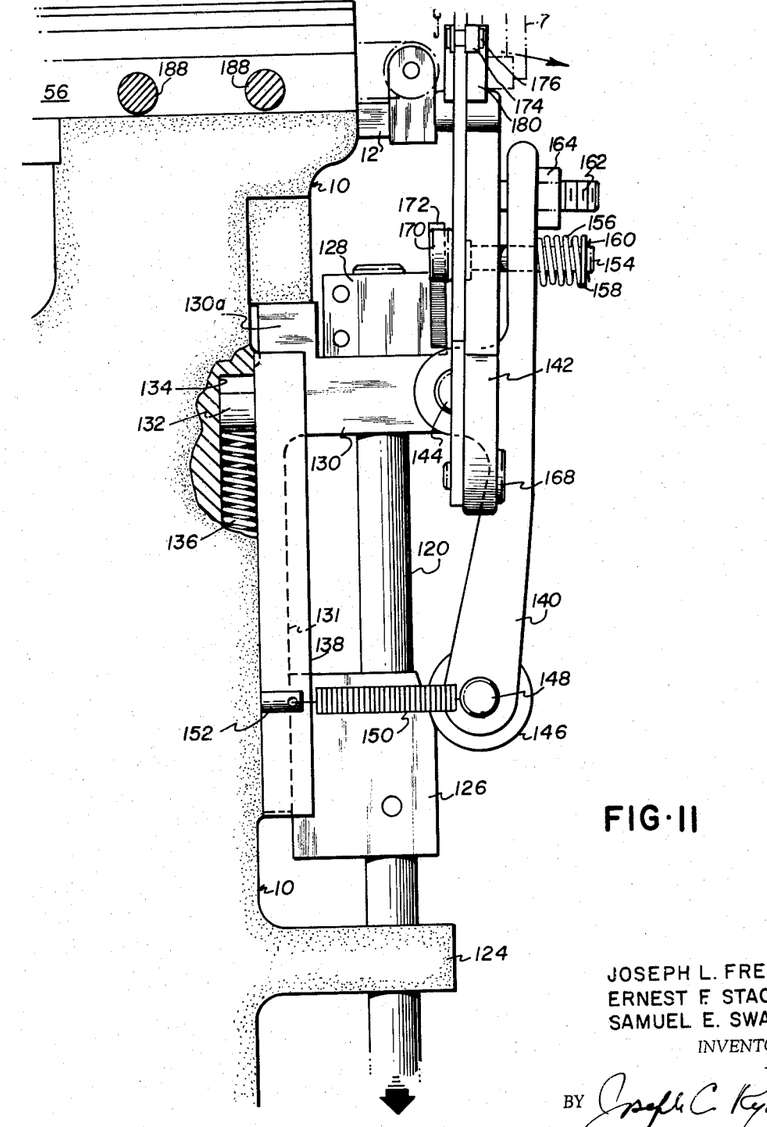
FIG. 11 is a side elevational view partially in section showing the back jaw assembly in an intermediate position during an operational cycle thereof.

After a filament 1 has been positioned within the hooks 3a of the lead-in wires 3 as just described, a final adjustment of the filament within the hooks is effected and immediately thereafter the hooks are closed to thereby securely clamp the filament to the lead-in wires. The means employed to perform the final filament adjusting and clamping operations are illustrated in FIGS. 1 and 10-13. The filament adjusting means and a portion of the filament clamping means are organized about a shaft 120. As shown in FIG. 10, the shaft 120 is in the down or rest position and thus the mechanisms associated therewith are displaced somewhat from the lamp stem 5 supported in a head 7 of a lamp stem making machine of the type referred to above. As shown in FIG. 1 the shaft 120 and the several mechanisms associated therewith have been advanced to their operating positions and in operative relationship with respect to the lamp stem 5.

As shown in FIG. 1, the shaft 120 extends through and is supported by a pair of arms 122 and 124 formed integral with and extending laterally from the main support bracket 10. Referring now particularly to FIG. 10, the upper end of the shaft 120 has a bar cam 126 pinned thereto immediately above arm 124 and a cam support block 128 secured thereto near the top thereof. A slide 130 is slidably disposed on the shaft 120 between bar cam 126 and cam support block 128. A stud 132 projects rearwardly from the slide 130 and lies within a channel 134 provided therefor in the adjacent face of the main support bracket 10. A compression spring 136 is disposed in the channel 134. The upper end of this spring 136 abuts the stud 132 and exerts a driving force therethrough on the slide 130. As shown in FIG. 10, the compression spring 136 is loaded and the slide 130 is prevented from moving upwardly by the cam support block 128 attached to the upper end of the shaft 120. The slide 130 is provided with a depending leg 131 which defines a bearing surface for the face of bar cam 126 adjacent thereto. A pair of spaced cover plates 138, secured to the main support bracket 10, enclose the depending leg 131 of the slide 130, the spacing therebetween being sufficient to permit movement of the bar cam 126 as it is reciprocated along the depending leg 131 of the slide 130 by the shaft 120.

A pivot bracket 140 and a back jaw bracket 142 are pivotally supported on a common shaft 144 which is supported in the front end of slide 130. Both the back jaw bracket 142 and the pivot bracket 140 are disposed astride the front end of the slide 130 with the former being in turn disposed astride the latter on the pivot shaft 144. The lower end of the pivot bracket 140 is bifurcated and a cam roller 146 is disposed therebetween and is supported on a roller pin 148. The cam roller 146 is maintained in firm frictional engagement with the bar cam 126 by a pair of springs 150. One end of each of these springs is connected to an end of the roller pin 148 and the other end thereof is connected to a spring pin 152 secured to the main support bracket 10. A pin 154 is fitted in the back jaw bracket 142 and extends freely through the pivot bracket 140. A compression spring 156 is disposed on the pin 154 between the outside face of the pivot bracket 140 and a washer 158 disposed on the outer end of pin 154 is held thereon by a pin 160. An adjustment screw 162 is threaded through the pivot bracket 140, abuts the back jaw bracket 142 and is locked in a predetermined position by the locking nut 164.

Figure 13:
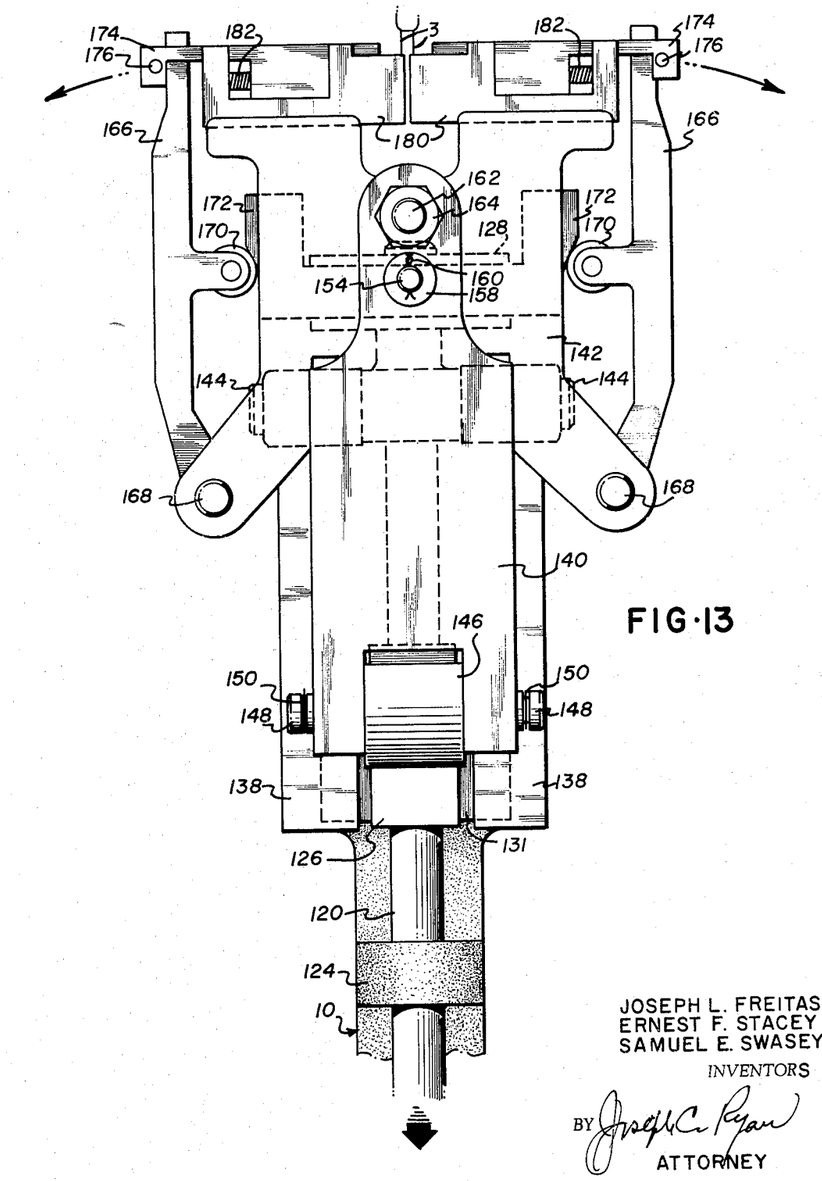
FIG. 13 is an end elevational view looking in the direction 13—13 of FIG. 1, showing the back jaw assembly in its forward or advanced position.

As is shown in FIGS. 10 and 13, the back jaw bracket 142 has a pair of centering levers 166 pivotally connected thereto at 168. Each centering lever 166 supports a cam roller 170 intermediate its ends. Each of these cam rollers 170 rides along a corresponding bar cam 172 secured to the cam support block 128. The upper end of each centering lever 166 lies within the bifurcated outer end of a filament centering arm 174 as shown in FIGS. 13 and 14.

A pin 176 in the end of each filament centering arm 174 prevents the upper end of each centering lever 166 from becoming disengaged. As shown particularly in FIG. 14, each filament centering arm 174 is provided with a pair of elongated slots 177 through which screws 178 extend. These screws 178 extend into the top faces of a substantially U-shaped back jaw 180 which, as shown in FIG. 13, is secured to the back jaw bracket 142. As shown in FIG. 14, the back jaw 180 includes a projecting plate 180a which, in the operation of the mechanism, is advanced to a position behind and in abutting relationship with respect to the pair of lead-in wires 3 and behind the hooks 3a on which a filament 1 is disposed. Each filament centering arm 174 is provided with a projecting finger 174a which, in the operation of the mechanism, is moved into end-on engagement with the adjacent end of the filament 1. A filament centering arm drive spring 182, as shown in FIGS. 13 and 14, is seated in an aperture provided therefor in the filament centering arm 174 and abuts an adjacent face of a leg of the substantially U-shaped back jaw 180.

*Operation of final filament orientation assembly*

Figure 12:
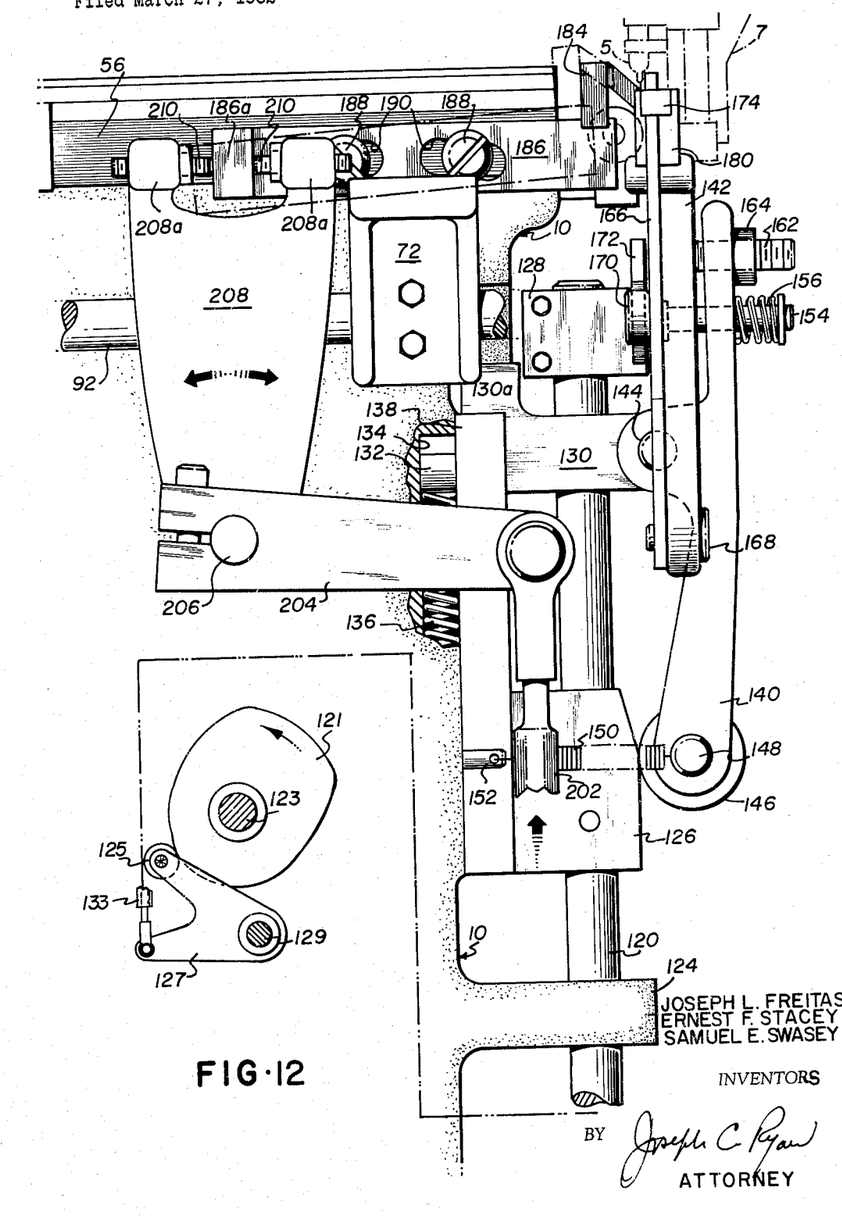
FIG. 12 is a side elevational view partly in section showing the back jaw assembly in its forward or advanced position and the clamping jaws in their advanced position.

Actuation of the mechanism just described to advance the components thereof into the position shown in FIGS. 13 and 14 will now be described. As noted above, the final filament adjusting means and a portion of the filament clamping means are organized about the shaft 120. As shown in FIG. 12, the shaft 120 is actuated by a back jaw cam 121 on a back jaw cam shaft 123. A cam roller 125 supported on one end of a rocker arm 127 rides on the back jaw cam 121. The rocker arm 127 is supported intermediate its ends on a rocker arm shaft 129. A connecting rod 133 connects the other end of rocker arm 127 to the shaft 120. The normal rest position of the shaft 120 and the mechanisms organized thereabout is as shown in FIG. 10. When the shaft 120 is moved upwardly, the bar cam 126 and the cam support block 128 move with it since they are both secured thereto. During this first phase of the upward movement of the shaft 120, the slide 130 disposed thereon is driven with it by the compression spring 136 through the stud 132 as shown particularly in FIG. 10. The slide 130 moves with the shaft 120 until the projection 130a of the slide 130 engages a stop formed in the main support bracket 10. Thus, during this first phase of the upward movement of shaft 120, the pivot bracket 140 and the back jaw bracket 142 moves upwardly with the slide 130 since both of these members are pivotally supported on the pivot shaft 144 in the slide 130. During this first phase of the upward movement of shaft 120, the pivot bracket 140 and the back jaw bracket 142 are displaced from the FIG. 10 position to the FIG. 11 position.

During the second or final phase of the upward movement of the shaft 120, neither the pivot bracket 140 nor the back jaw bracket 142 will move upwardly therewith because the slide 130 on which they are pivotally supported has reached the upper limit of its stroke as noted above. However, since the cam support block 128 and the bar cam 126 are fixedly secured to the shaft 120, they move upwardly during this second or final phase of the upward movement of the shaft 120. This second or final phase of the upward movement of the shaft 120 effects a displacement of the bar cam 126 with respect to the cam roller 146 which rides thereon from the FIG. 11 position to the FIG. 12 position. Similarly, the bar cams 172 attached to the cam support block 128 are displaced with respect to their respective cam rollers 170 from their FIG. 11 positions to the positions occupied by them as shown in FIGS. 12 and 13.

This displacement of the bar cam 126 with respect to the cam roller 146 causes a counterclockwise rotational movement of the pivot bracket 140 on its pivot 144. A similar displacement of the back jaw bracket 142 is also effected through the combination of the compression spring 156 and the adjustment screw 162 which maintain these two members in uniform spaced relationship. Thus the pivot bracket 140, the back jaw bracket 142 and the several components associated therewith are displaced from the FIG. 11 position to the position thereof shown in FIGS. 12 and 13.

At the end of the second or final phase of the upward stroke of the shaft 120 the substantially U-shaped back jaws 180 and the filament centering arms 174 are disposed as shown on a greatly enlarged scale in FIG. 14. As shown in this figure, the projecting plates 180a of the back jaws 180 have moved into abutting relationship with respect to the lead-in wires 3 and the projecting fingers 174a of the filament centering arms 174 have moved into end-on engagement with the ends of the filament 1. The projecting plates 180a of the back jaws 180 have been moved into this position by the displacement of the bar cam 126 with respect to the cam roller 146 from the FIG. 11 position to the FIG. 12. The projecting fingers 174a of the filament centering arms 174 have been caused to assume the disposition thereof as shown in FIG. 14 by the displacement of the bar cams 172 with respect to their cam rollers 170 from the FIG. 11 position to the position thereof as shown in FIGS. 12 and 13. This latter displacement caused the centering levers 166 to rotate toward one another about their pivots 168 as shown in FIG. 13 and thus permit the loaded compression springs 182 to advance the filament centering arms 174 and move the projecting fingers 174a thereof into engagement with the ends of the filament 1. As is shown in FIG. 14, the lead-in wires 3 are backed up by the plates 180a of the back jaws 180 and the filament 1 has been centered in the hooks 3a of the lead-in wires by the fingers 174a of the filament centering arms 174. The last and final operation to be performed is clamping or closing of the hooks 3a about the filament 1 to secure it to the lead-in wires 3.

*Clamping*

Clamping of the hooks 3a about the filament 1 to secure it to the lead-in wire 3 is effected by a pair of clamping heads 184. As shown in FIGS. 14 and 15, each clamping head 184 is fixedly mounted on the front end of a clamping head arm 186. Clamping is effected by displacement of each of the clamping heads and clamping head arms from the solid position to the phantom position as shown in FIG. 15. As shown in the phantom position, the forward end or nose of the clamping head 184 has moved into engagement with and displaced the hook 3a of the lead-in wire 3 and closed it with respect to the filament 1, the projecting plate 180a of the back jaw 180 serving as a bearing or working surface for this clamping operation. The clamping heads 184 are also shown in the closed position with respect to the hooks 3a of the lead-in wires 3 in FIGS. 1 and 12. As shown in these two figures, each clamping head arm 186 is disposed on a side face of the slide housing 56. Each clamping head arm 186 is supported on a side face of the slide housing 56 by a pair of screws 188 projecting from the slide housing 56 and through elongated slots 190 formed in the clamping head arm 186. The contour of these slots 190 in the clamping head arm 186 is such that it provides for the displacement of the clamping head 184 and the clamping head arm 186 from the solid to the phantom position shown in FIG. 15. This displacement of the clamping head arms 186 is effected by a hook clamping cam 192 on cam shaft 194 as shown in FIG. 1. As shown in FIG. 1, a cam follower 196, supported on one end of a rocker arm 198, rides on the hook clamping cam 192. The rocker arm 198 is supported intermediate its ends on a rocker arm shaft 200. A connecting rod 202 connects the other end of rocker arm 198 to one end of a lever 204. The other end of the lever 204 is clamped to an end of lever shaft 206. The lever shaft 206 extends through and is rotatable in the main support bracket 10. As is shown in FIGS. 1 and 12, a lever 208 is secured at one end thereof to the lever shaft 206. There are two of these levers 208, one on each side of the main support bracket 10. The upper end of each of these levers 208 is provided with a pair of bosses 208a through which stop screws 210 extend. The stop screws 210 abut opposite faces of a lateral projection 186a of the clamping head arm 186. Thus, as the arrows on lever 208 in FIG. 12 indicate, each clamping head arm 186 and its associated clamping head is rocked into and out of clamping engagement with the hooks of the lead-in wires by the rocking of the lever 208 about the lever shaft 206 as a pivot, this movement being transmitted to each clamping head arm 186 through the screws 188 and the lateral projection 186a of the arm 186.

*Operation*

Figure 16:
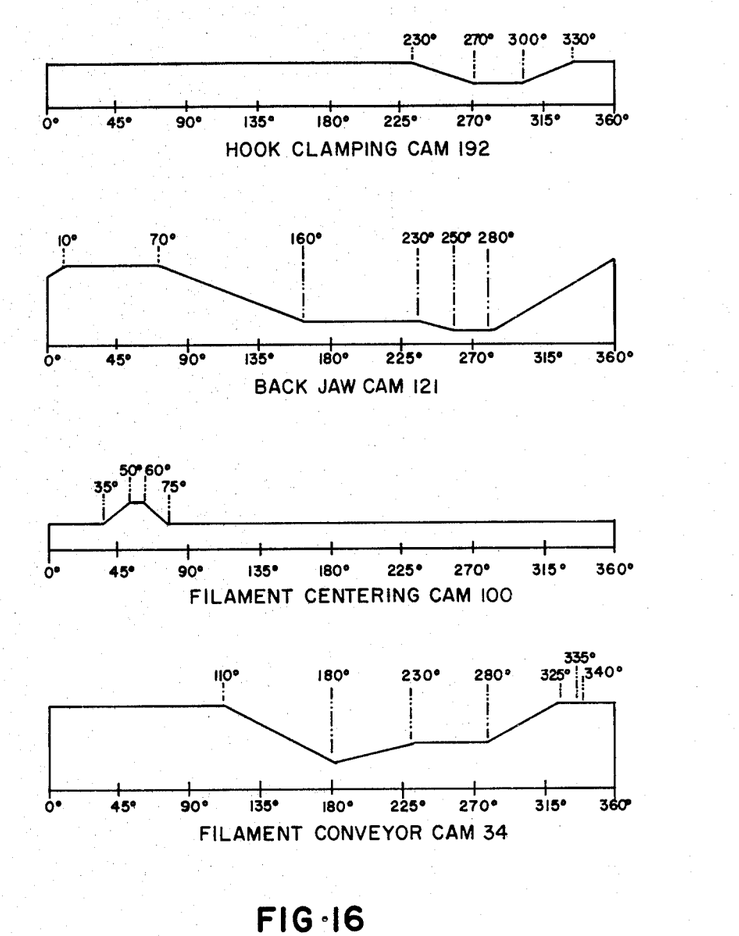
FIG. 16 is a developed schematic illustration of the several cams which actuate the major components of the apparatus.

The operation of the foregoing apparatus will now be described, reference being made particularly to FIG. 16 which is a developed schematic illustration of cams 34, 100, 121 and 192.

The filament conveyor cam 34 controls the operation of the filament conveyor 14 and its associated parts which are shown primarily in FIGS. 1–4 and which are described in detail above the sections entitled The Filament Conveyor and Operation of Filament Conveyor. The filament conveyor 14 is shown in its advanced or forward position in FIG. 1. In its normal rest position, at 0° on the cam 34, the conveyor 14 is held in a retracted position by the cam 34 through the bellcrank lever 22 as shown in FIG. 3. The filament conveyor 14 is maintained in this retracted position from 0° to 110° as shown in FIG. 16. Starting at 110° and continuing to 180°, the contour of the cam 34 is such that it causes counterclockwise rotational displacement of the bellcrank lever 22 (FIG. 3) thus permitting the springs 20 to drive the slide 12 and the filament conveyor 14 mounted thereon forward or to the left as viewed in FIG. 3. This displacement of the slide 12 and the filament conveyor 14 mounted thereon advances the filament conveyor 14 from the FIG. 9 position to the FIG. 6 position. From 180° to 230°, the filament conveyor cam 34 causes clockwise rotational movement of the bellcrank lever 22, causing it to displace the block 16 and the slide 12 on which it is mounted to the right as viewed in FIG. 3. Since, for the reasons noted above, the pawl 74 prevents rearward displacement of the upper reaches of the chains 38, the filament carrier 40a is displaced from the solid to the phantom position as shown in FIG. 6 and the sprocket 42 is similarly displaced. Thus, at 230°, a filament carrier has been moved to a position between the lead-in wires 3, and the filament 1 which it carries extends through the hooks 3a of the lead-in wires 3 as shown in FIGS. 7 and 8. The dwell of the cam 34 from 230° to 280° permits the filament carrier to support the filament as shown in FIGS. 7 and 8 during the time when final adjustment of the filament and clamping of the filament in the hooks is effected. At 280°, i.e., after clamping, the cam 34 through the bellcrank lever 22 effects further displacement of the slide 12 through the block 16. This action continues until 325°. During this period, the filament carrier 40a is displaced from the FIG. 8 position to the position occupied by filament carrier 40a in FIG. 9.

The filament centering cam 100 controls the operation of the filament orientation plates 62 and 64 and their associated parts which are shown primarily in FIGS 1, 2, 4 and 5 and which are described in detail above in the section entitled Filament Orientation. As shown in FIG. 16, the filament centering cam 100 causes a filament centering or orienting operation to be performed during each 360° cycle of the filament conveyor cam 34 just described. Between 35° and 75° of an operating cycle, when the filament conveyor 14 and its associated parts are in their rest position, the filament centering cam 100, through the linkage shown in FIG. 5, causes the levers 94 to push the pads 96 toward one another and thus effect a similar displacement of the filament orienting plates 62 and 64 from which the pads 96 depend. Since the filament orienting plates 62 and 64 lie in substantially the same horizontal plane as the filaments supported in the carriers 40, this periodic nudging of the plates 62 and 64 periodically adjusts the disposition of the filaments in their carriers as the conveyor advances each carrier toward a discharge locus, i.e., from the bottom to the top as viewed in FIG. 2.

The back jaw cam 121 controls the operation of the back jaws 180 and the filament centering arms 174 and their associated parts which are shown primarily in FIGS. 1 and 10–14 and which are described in detail above in the sections entitled Final Filament Orientation Assembly and Operation of Final Filament Orientation Assembly. The cam 121 and the linkage associated therewith are shown in FIG. 12. The mechanisms actuated by the cam 121 are shown in their rest position in FIG. 10, this position corresponding to 0° on cam 121 in FIG. 16 and being provided to permit a head 7 of a lamp stem machine to move into position with a lamp stem 5. From 70° to 160°, the cam 121 displaces the mechanisms associated therewith from the FIG. 10 position to the FIG. 11 position. During this time the cam 121 causes the shaft 120 to move upwardly, carrying with it bar cam 126 and cam support block 128 which are secured thereto, and permitting the slide 130 and the members supported thereon to be driven upwardly by the spring 136. During the dwell from 160° to 230° the mechanisms associated with the cam 121 remain in the FIG. 11 position and, as described above, a filament is being presented to the hooks 3a of the lead-in wires 3. From 230° to 250° the cam 121 displaces the mechanisms associated therewith from the FIG. 11 position to the positions occupied by them as illustrated in FIG. 12–14. During this travel from 230° to 250°, the shaft 120 moves upwardly and the bar cam 126 and cam support block 128 secured thereto move with it but the slide 130 and the members supported therefrom do not move upwardly. The relative displacement of the cam roller 146 with respect to the bar cam 126 causes counter-clockwise rotation of the pivot bracket 140 on the slide 130 from the FIG. 11 position to the FIG. 12 position. This brings the back jaws 180 and their projecting plates 180a into the position shown in FIG. 14. The relative displacement of the cam rollers 170 with respect to the bar cams 172 causes the free ends of the centering levers 166, pivoting about 168, to move toward one another as shown in FIGS. 13 and 14. As is shown in FIG. 14, this permits the drive springs 182 to advance the projecting fingers 174a of the filament centering arms 174 into end-on engagement with the ends of the filament 1 immediately before it is clamped in the hooks 3a of the lead-in wires 3. It may be noted at this point that, although a carrier 40 is actually supporting the filament 1 at this time, the illustration thereof has been omitted from FIG. 14 for clarity of illustration of the mechanisms presently being described. From 250° to 280° there is a dwell during which time the filament clamping operation is effected. Immediately thereafter, the cam 121 returns the mechanisms just described to their normal rest position.

The hook clamping cam 192 controls the operation of the clamping heads 184 and their associated parts which are shown primarily in FIGS. 1, 14 and 15 and which are described in detail above in the section entitled Clamping. The clamping heads 184 are shown in their rest position in FIGS. 14 and 15 and in their advanced position in FIG. 1. The operating cycle of the clamping heads 184 occurs between 230° and 330° on the cam 192 as shown in FIG. 16. Starting at 230°, the clamping heads 184 are advanced toward the work and, with the projecting plates 180a of the back jaws 180 serving as a working surface, they displace the hooks 3a of the lead-in wires 3 and close them on the ends of the filament 1 to thereby secure it to the lead-in wires. Return of the clamping heads 184 to their normal rest position is effected between 300° and 330°.

What we claim is:

1. The method of transferring articles sequentially from article carriers of a conveyor to a pair of spaced article-receiving members, said method comprising: reciprocating said conveyor from a retracted to an advanced position whereby an article carrier at the delivery end thereof has been positioned between said pair of spaced article-receiving members; and indexing said conveyor during the return stroke thereof whereby said article carrier delivers an article carried thereby to said pair of spaced article-receiving members and another article carrier is advanced to the delivery end of said conveyor.

2. The method of transferring articles sequentially from article carriers of a conveyor to a pair of spaced article-receiving members, said method comprising: reciprocating said conveyor from a retracted to an advanced position whereby, at the end of the forward stroke of said conveyor, an article carrier at the delivery end thereof has been positioned between said pair of spaced article-receiving members; and indexing said conveyor during the return stroke thereof whereby said article carrier delivers an article carried thereby to said pair of spaced article-receiving members and another article carrier is advanced to the delivery end of said conveyor.

3. The method of transferring articles sequentially from article carriers of a conveyor to a pair of spaced article-receiving members, said method comprising: reciprocating said conveyor from a retracted to an advanced position whereby, at the end of the forward stroke of said conveyor, an article carrier at the delivery end thereof has been positioned between said pair of spaced article-receiving members in an article-presenting position; indexing said conveyor during the return stroke thereof, said indexing and said return stroke being effected in two stages with a dwell therebetween, said article carrier at the delivery end of said conveyor being displaced from said article-presenting position to an article-seating position during said first stage, and said article carrier at the delivery end of said conveyor being displaced from said article-seating position and another article carrier being advanced to the delivery end of said conveyor during said second stage; and securing the article, on said article carrier at the delivery end of said conveyor, to said pair of spaced article-receiving members during said dwell.

4. The method of transferring articles sequentially from article carriers of a conveyor to a pair of spaced article-receiving members, said method comprising: reciprocating said conveyor from a retracted to an advanced position whereby, at the end of the forward stroke of said conveyor, an article carrier at the delivery end thereof has been positioned between said pair of spaced article-receiving members in an article-presenting position; indexing said conveyor during the return stroke thereof, said indexing and said return stroke being effected in two stages with a dwell therebetween, said article carrier at the delivery end of said conveyor being displaced from said article-presenting position to an article-seating position during said first stage, and said article carrier at the delivery end of said conveyor being displaced from said article-seating position and another article carrier being advanced to the delivery end of said conveyor during said second stage; adjusting the relative disposition of the article, on said article carrier in said article-seating position, with respect to said pair of spaced article-receiving members during said dwell; and securing the article, on said article carrier at the delivery end of said conveyor, to said pair of spaced article-receiving members during said dwell and after said adjusting.

5. Apparatus for transferring an article to a pair of article-receiving members, said apparatus comprising: a conveyor having a delivery end; a plurality of article-supporting carriers mounted on said conveyor; means for reciprocating said conveyor to advance a carrier at the delivery end thereof to an article-presenting position with respect to said pair of article-receiving members on the forward stroke of said conveyor; and means for effecting indexing of said conveyor during the return stroke of its reciprocation.

6. Apparatus for transferring an article to a pair of article-receiving members, said apparatus comprising: a conveyor having a delivery end; a plurality of article-supporting carriers mounted on said conveyor; means for reciprocating said conveyor to advance a carrier at the delivery end thereof to a position between said pair of article-receiving members on the forward stroke of said conveyor; and means for effecting indexing of said conveyor during the return stroke of its reciprocation.

7. Apparatus for transferring an article to a pair of article-receiving members, said apparatus comprising: a conveyor having a delivery end; a plurality of article-supporting carriers mounted on said conveyor, each of said carriers having an article extending thereacross with the ends of said article overhanging the sides of said carrier; means for reciprocating said conveyor to advance a carrier at the delivery end thereof to a position between said pair of article-receiving members on the forward stroke of said conveyor; and means for effecting indexing of said conveyor during the return stroke of its reciprocation, said return stroke and said indexing being accomplished in two phases, the first phase effecting a seating of the said overhanging ends of said article astride said pair of article-receiving members and the second phase effecting a withdrawal of said carrier from between said pair of article-receiving members.

8. Apparatus for transferring an article to a pair of article-receiving members, said apparatus comprising: a conveyor having a delivery end; a plurality of article-supporting carriers mounted on said conveyor; means for reciprocating said conveyor to advance a carrier at the delivery end thereof to an article-presenting position with respect to said pair of article-receiving members on the forward stroke of said conveyor; means for securing said article to said article-receiving members while said article is supported by its carriers; and means for effecting indexing of said conveyor during the return stroke of its reciprocation.

9. Apparatus for sequentially transferring articles to a pair of article-receiving members, said apparatus comprising: a conveyor having a delivery end; a plurality of article-supporting carriers mounted in spaced relationship on said conveyor; means for reciprocating said conveyor to advance a carrier at the delivery end thereof to an article-presenting position with respect to said pair of article-receiving members on the forward stroke of said reciprocating conveyor; means for securing the article, in said carrier at the delivery end of said conveyor, to said article-receiving members; and means for effecting indexing of said conveyor during the return stroke of its reciprocation whereby said carrier at the delivery end of said conveyor is displaced therefrom and another carrier is advanced thereto.

10. Apparatus for sequentially transferring articles to a pair of article-receiving members, said apparatus comprising: a conveyor having a delivery end; a plurality of article-supporting carriers mounted in spaced relationship on said conveyor; means for reciprocating said conveyor to advance a carrier at the delivery end thereof to an article-presenting position with respect to said pair of article-receiving members on the forward stroke of said reciprocating conveyor; means for securing the article, in said carrier at the delivery end of said conveyor, to said article-receiving members; means for effecting indexing of said conveyor during the return stroke of its reciprocation whereby said carrier at the delivery end of said conveyor is displaced therefrom and another carrier is advanced thereto; and means for periodically adjusting the disposition of articles in their carriers during the dwell periods of said conveyor in its retracted position.

11. Apparatus for sequentially transferring articles to a pair of article-receiving members, said apparatus comprising: a conveyor having a delivery end; a plurality of article-supporting carriers mounted in spaced relationship on said conveyor; means for reciprocating said conveyor to advance a carrier at the delivery end thereof to an article-presenting position with respect to said pair of article-receiving members on the forward stroke of said reciprocating conveyor; means for securing the article, in said carrier at the delivery end of said conveyor, to said article-receiving members; means for effecting indexing of said conveyor during the return stroke of its reciprocation whereby said carrier at the delivery end of said conveyor is displaced therefrom and another carrier is advanced thereto; and means for adjusting the disposition of the article in the carrier at the delivery end of said conveyor after it has been presented to said pair of article-receiving members.

12. Apparatus for sequentially transferring articles to a pair of article-receiving members, said apparatus comprising: a conveyor having a delivery end; a plurality of article-supporting carriers mounted in spaced relationship on said conveyor; means for reciprocating said conveyor to advance a carrier at the delivery end thereof to an article-presenting position with respect to said pair of article-receiving members on the forward stroke of said reciprocating conveyor; means for securing the article, in said carrier at the delivery end of said conveyor, to said article-receiving members; means for effecting indexing of said conveyor during the return stroke of its reciprocation whereby said carrier at the delivery end of said conveyor is displaced therefrom and another carrier is advanced thereto; means for periodically adjusting the disposition of articles in their carriers during the dwell periods of said conveyor in its retracted position; and means for adjusting the disposition of the article in the carrier at the delivery end of said conveyor after it has been presented to said pair of article-receiving members.

References Cited by the Examiner
UNITED STATES PATENTS

| | | | |
|---|---|---|---|
| 2,843,278 | 7/58 | Queflander | 214—152 |
| 2,893,009 | 7/59 | Bergsland et al. | 198—19 XR |
| 3,039,497 | 6/62 | Hamilton et al. | 140—71.6 |
| 3,069,749 | 12/62 | Gartner | 29—25.2 |
| 3,082,859 | 3/63 | Hagner et al. | 198—135 |

CHARLES W. LANHAM, *Primary Examiner.*

WHITMORE A. WILTZ, *Examiner.*